(12) United States Patent
Bae et al.

(10) Patent No.: US 11,838,239 B2
(45) Date of Patent: Dec. 5, 2023

(54) METHOD FOR RECEIVING HARQ-ACK FEEDBACK IN WIRELESS COMMUNICATION SYSTEM, AND DEVICE THEREFOR

(71) Applicant: LG ELECTRONICS INC., Seoul (KR)

(72) Inventors: Duckhyun Bae, Seoul (KR); Yunjung Yi, Seoul (KR); Hyunho Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 17/260,186

(22) PCT Filed: Jul. 16, 2019

(86) PCT No.: PCT/KR2019/008793
§ 371 (c)(1),
(2) Date: Jan. 13, 2021

(87) PCT Pub. No.: WO2020/017874
PCT Pub. Date: Jan. 23, 2020

(65) Prior Publication Data
US 2021/0314126 A1    Oct. 7, 2021

(30) Foreign Application Priority Data
Jul. 16, 2018 (KR) .......... 10-2018-0082105

(51) Int. Cl.
*H04W 72/23* (2023.01)
*H04L 5/00* (2006.01)

(52) U.S. Cl.
CPC .......... *H04L 5/0055* (2013.01); *H04W 72/23* (2023.01)

(58) Field of Classification Search
CPC ... H04L 5/0055; H04L 1/1819; H04L 1/1822; H04L 1/1896; H04L 5/0053; H04W 72/1289; H04W 72/14; H04W 72/23
See application file for complete search history.

(56) References Cited

U.S. PATENT DOCUMENTS

2010/0322172 A1    12/2010 Hsu
2015/0078306 A1    3/2015 Meyer et al.
(Continued)

FOREIGN PATENT DOCUMENTS

CN    108633036 A    * 10/2018
JP    2012502567    1/2012
(Continued)

OTHER PUBLICATIONS

Experimental Evaluation on Throughput Performance of Asymmetric Carrier Aggregation in LTE-Advanced, Kakishima et al., IEEE Xplore (Year: 2011).*
(Continued)

*Primary Examiner* — Un C Cho
*Assistant Examiner* — Lalita W Pace
(74) *Attorney, Agent, or Firm* — LEE HONG DEGERMAN KANG & WAIMEY

(57) ABSTRACT

The present disclosure provides a method for receiving a HARQ-ACK feedback and an apparatus supporting the same. More particularly, the method performed by a user equipment includes transmitting, to a base station, an uplink data; and receiving, from the base station, first DCI for the uplink data, wherein the first DCI includes a New Data Indicator (NDI) field indicating a transmission or retransmission of the uplink data, wherein the first DCI is determined by DCI related to HARQ-ACK of the uplink data on whether the first DCI includes a UL grant, and when the first DCI is determined to be the DCI related to HARQ-ACK of
(Continued)

the uplink data, wherein the NDI field is identified to be related to the HARQ-ACK of the uplink data.

20 Claims, 10 Drawing Sheets

(56) References Cited

U.S. PATENT DOCUMENTS

| | | | |
|---|---|---|---|
| 2016/0198442 A1* | 7/2016 | Suzuki | H04W 72/0446 370/329 |
| 2017/0041104 A1 | 2/2017 | Sung et al. | |
| 2017/0272200 A1* | 9/2017 | Dinan | H04L 1/1822 |
| 2018/0368117 A1* | 12/2018 | Ying | H04L 1/0061 |
| 2019/0052432 A1* | 2/2019 | Islam | H04L 5/0094 |
| 2019/0082431 A1* | 3/2019 | Yi | H04L 5/0053 |
| 2019/0174466 A1* | 6/2019 | Zhang | H04L 5/005 |
| 2019/0327761 A1* | 10/2019 | Suzuki | H04L 1/189 |
| 2020/0014498 A1* | 1/2020 | Bergman | H04L 1/1896 |
| 2020/0067644 A1* | 2/2020 | Nan | H04L 1/12 |
| 2021/0167930 A1* | 6/2021 | Jeon | H04L 27/2607 |

FOREIGN PATENT DOCUMENTS

| | | |
|---|---|---|
| KR | 100937433 | 1/2010 |
| KR | 20100090632 | 8/2010 |
| KR | 20180006840 | 1/2018 |

OTHER PUBLICATIONS

PCT International Application No. PCT/KR2019/008793, International Search Report dated Nov. 20, 2019, 4 pages.

\* cited by examiner

[FIG. 1]
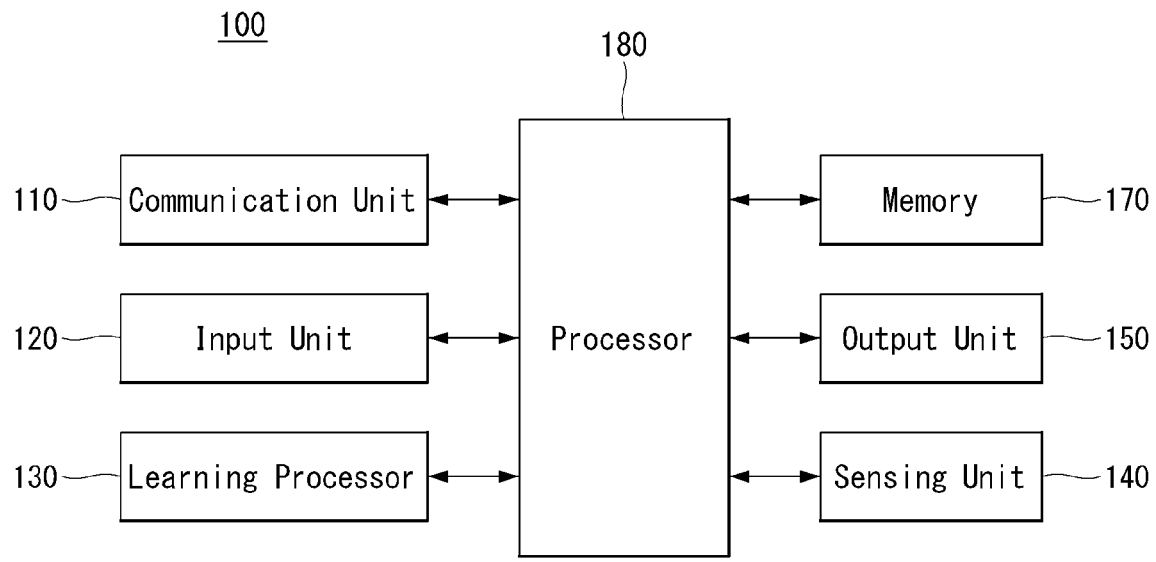
[FIG. 2]
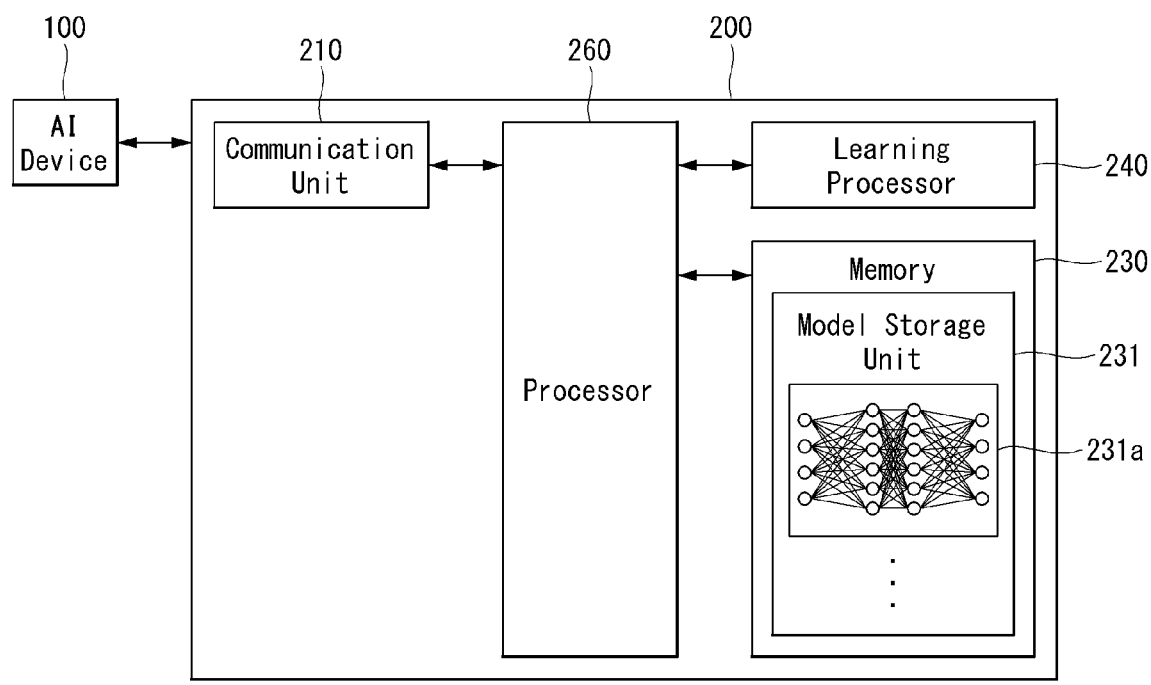

[FIG. 3]
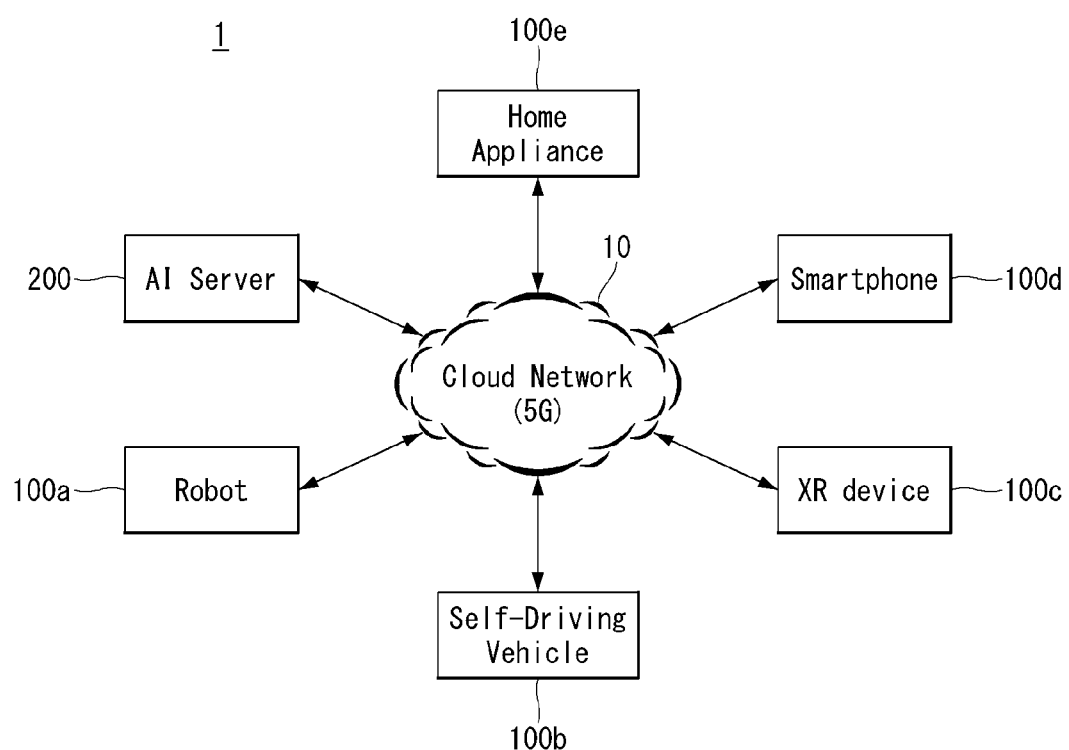

[FIG. 4]
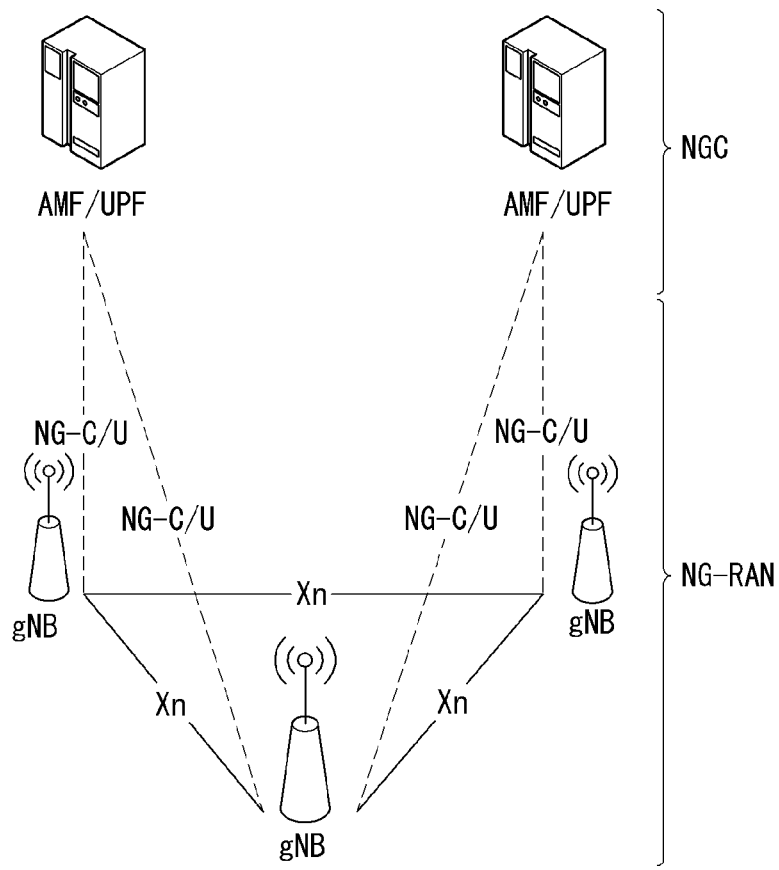
[FIG. 5]
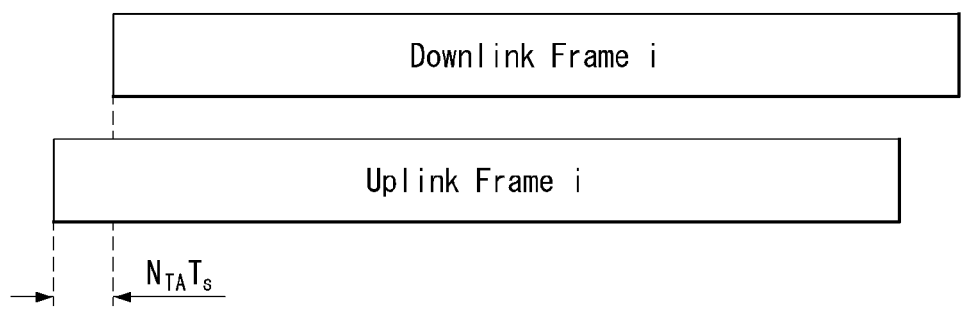

[FIG. 6]
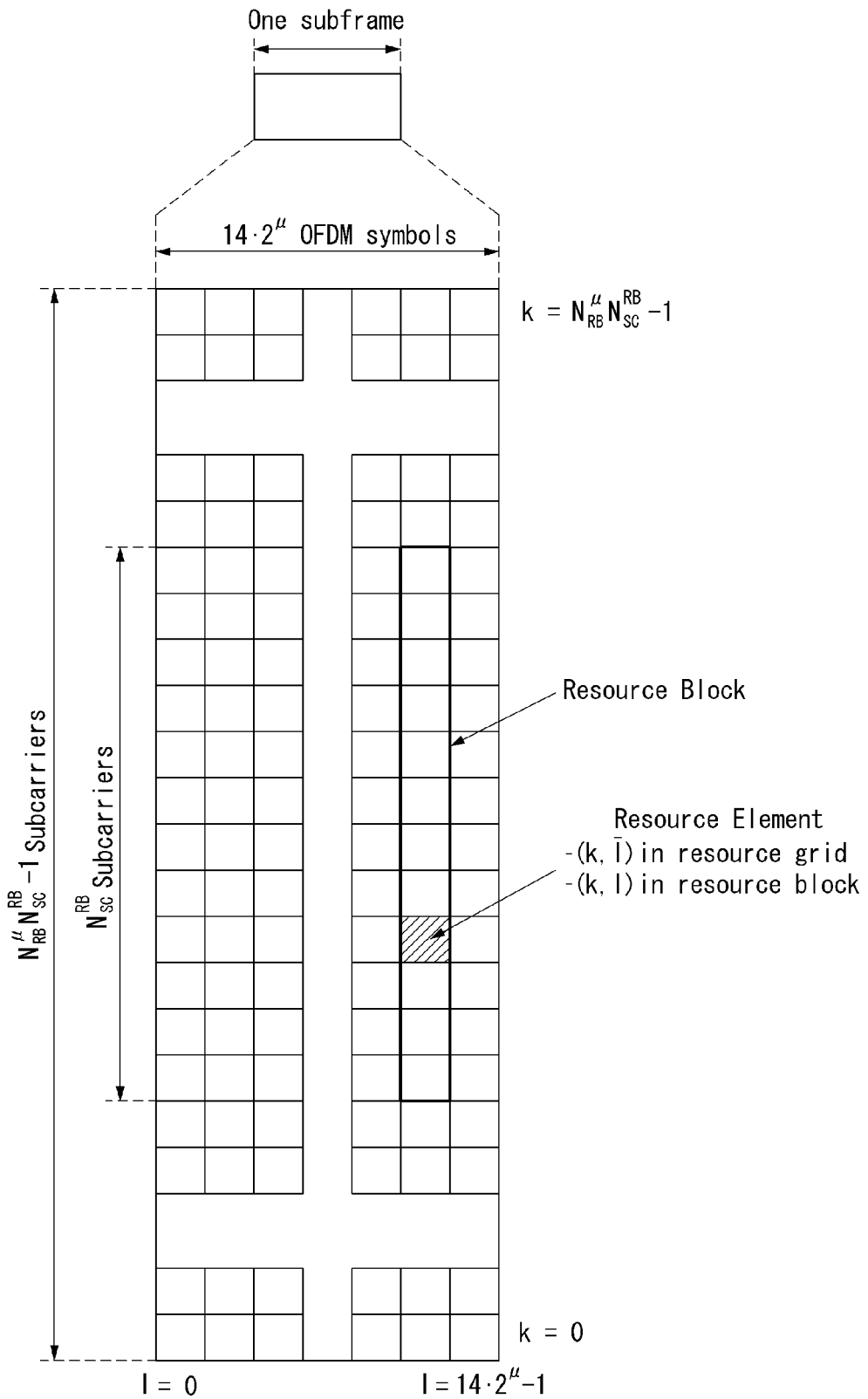

[FIG. 7]
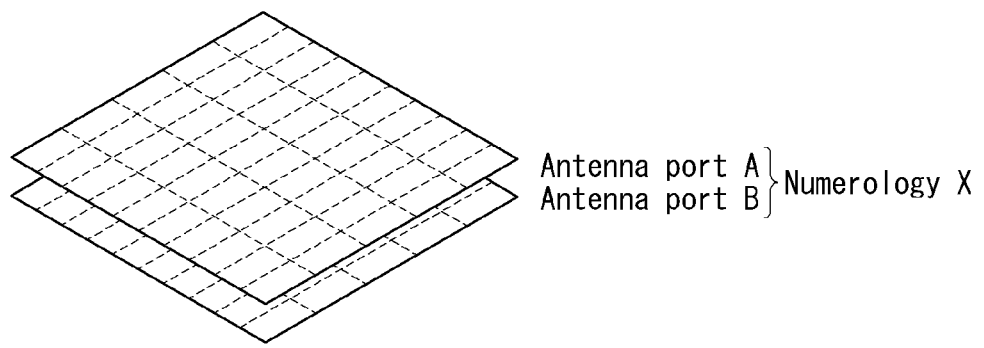
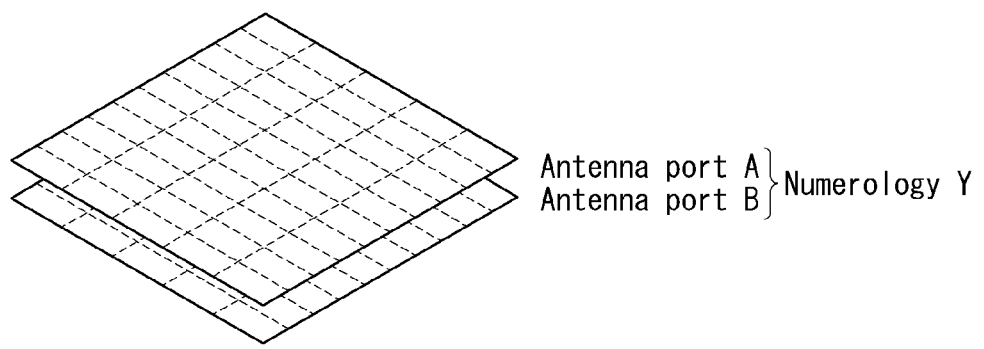

[FIG. 8]
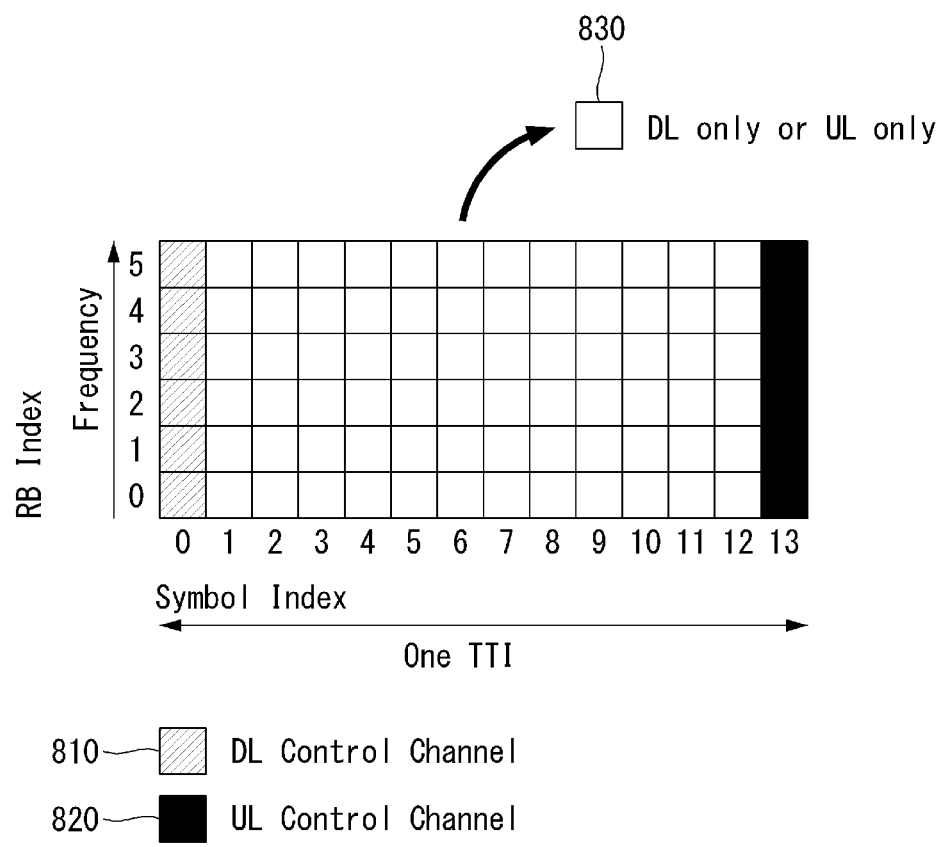

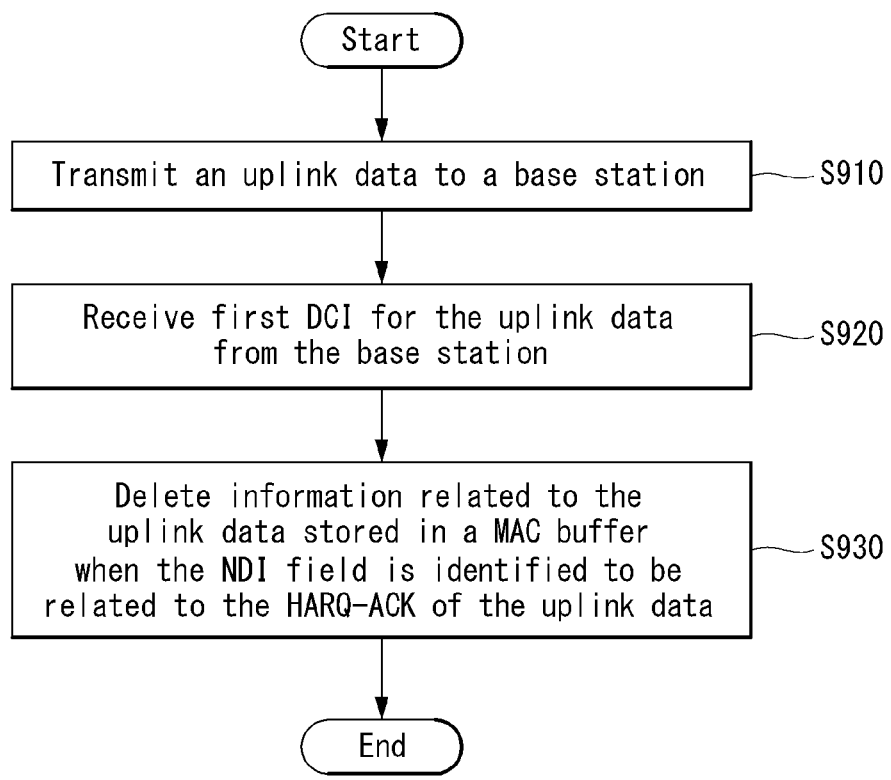
[FIG. 9]

[FIG. 10]
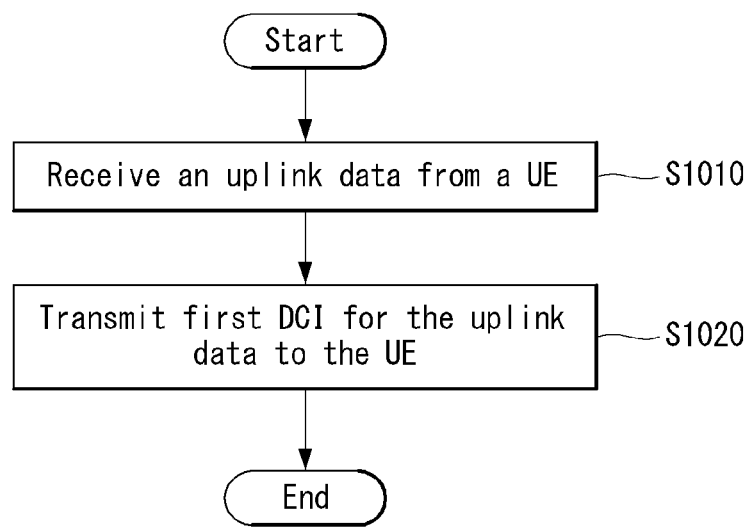

[FIG. 11]
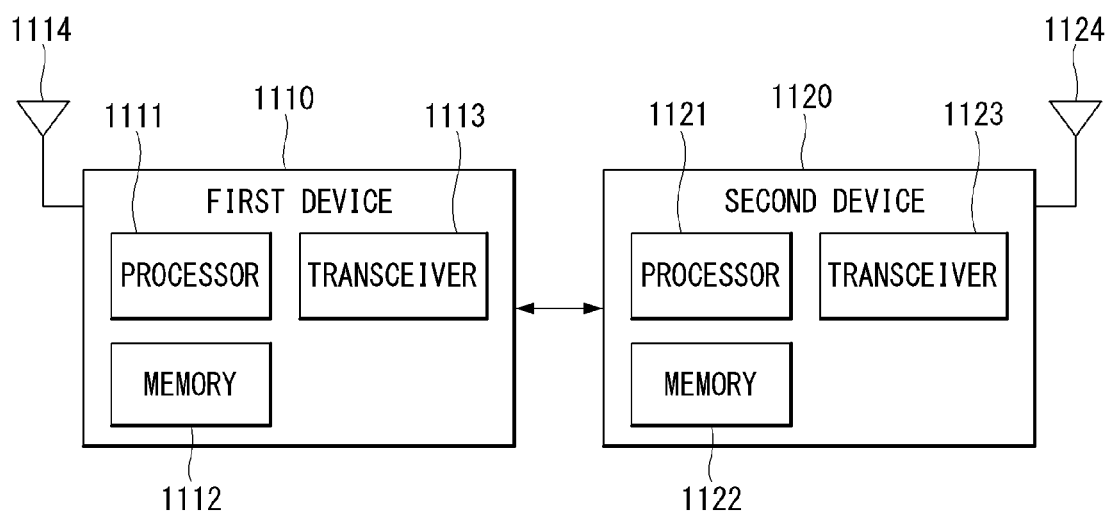

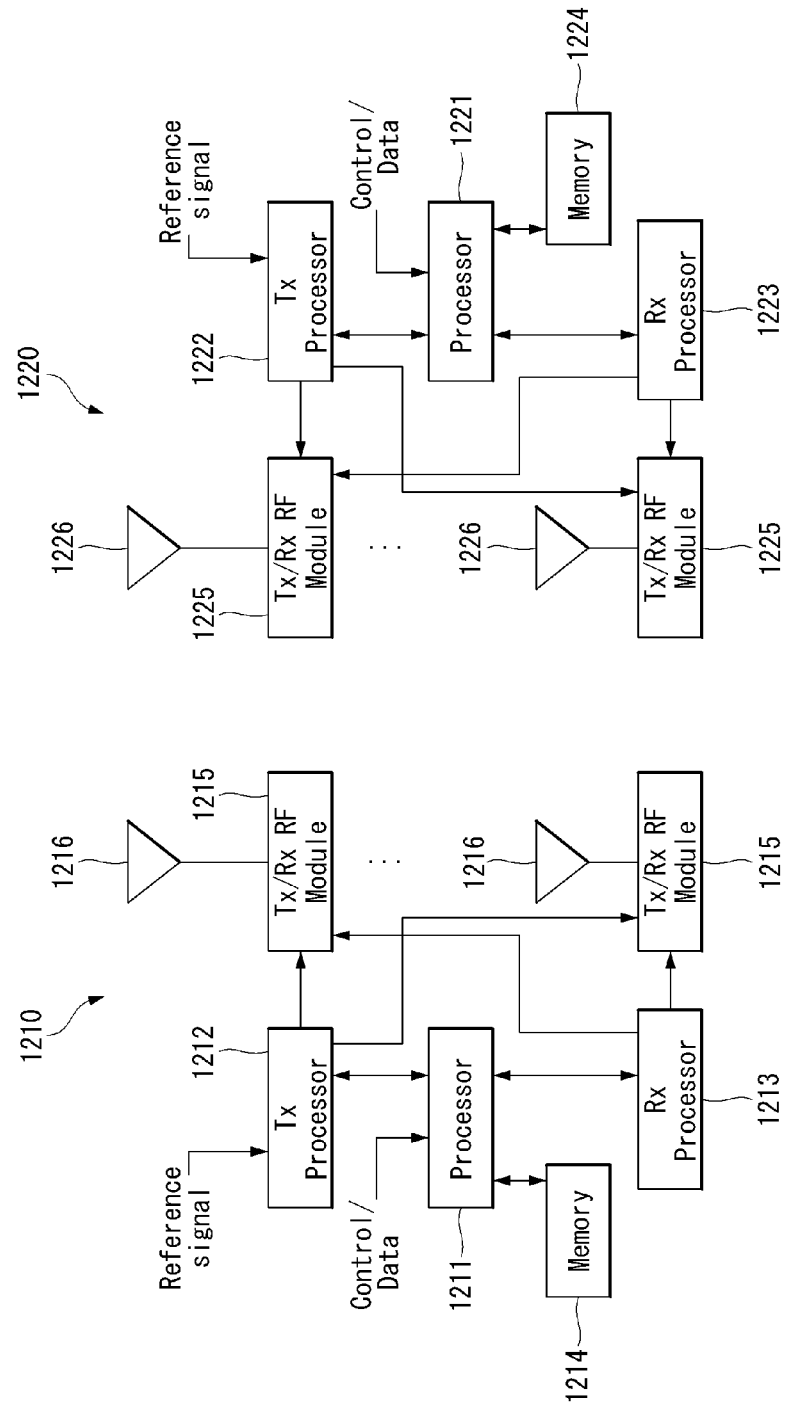
[FIG. 12]

METHOD FOR RECEIVING HARQ-ACK FEEDBACK IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/008793, filed on Jul. 16, 2019, which claims the benefit of KR Application No. 10-2018-0082105, filed on Jul. 16, 2018, the contents of which are all hereby incorporated by reference herein in their entirety.

TECHNICAL FIELD

The present disclosure relates to a wireless communication system and, more particularly, to a method for receiving a HARQ-ACK feedback and an apparatus supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

In an aspect, an object of the present disclosure is to provide a method for transmitting an explicit HARQ-ACK feedback for an uplink transmission.

In another aspect, an object of the present disclosure is to provide a method for configuring a code point of DCI to transmit an explicit HARQ-ACK feedback.

In another aspect, an object of the present disclosure is to provide a method for interpreting an NDI value due to an explicit HARQ-ACK feedback transmission.

In another aspect, an object of the present disclosure is to provide a method for configuring a code point including additional information to DCI to transmit an explicit HARQ-ACK feedback.

Objects of the disclosure are not limited to the foregoing, and other unmentioned objects would be apparent to one of ordinary skill in the art from the following description.

Technical Solution

The present disclosure provides a method for receiving an explicit HARQ-ACK using Downlink Control Information (DCI) in a wireless communication system.

Particularly, a method performed by a user equipment includes transmitting, to a base station, an uplink data; and receiving, from the base station, first DCI for the uplink data, wherein the first DCI includes a New Data Indicator (NDI) field indicating a transmission or retransmission of the uplink data, wherein the first DCI is determined by DCI related to HARQ-ACK of the uplink data on whether the first DCI includes a UL grant, and when the first DCI is determined to be the DCI related to HARQ-ACK of the uplink data, wherein the NDI field is identified to be related to the HARQ-ACK of the uplink data.

Furthermore, in the present disclosure, when the UL grant is not included in the first DCI, the NDI field is identified to be related to the HARQ-ACK of the uplink data, and when the UL grant is included in the first DCI, the NDI field is identified to be related to whether a new data is transmitted.

Furthermore, in the present disclosure, when the NDI field is identified to be related to the HARQ-ACK of the uplink data, a field value of the NDI field is dropped.

Furthermore, in the present disclosure, when the NDI field is identified to be related to the HARQ-ACK of the uplink data, a field value of the NDI field has a fixed value.

Furthermore, in the present disclosure, when the NDI field is identified to be related to whether a new data is transmitted, a field value of the NDI field is stored in a specific entity.

Furthermore, in the present disclosure, when the UL grant is not included in the first DCI, the first DCI further includes a Redundancy Version (RV) field and HARQ ID information, and the HARQ-ACK of the uplink data is determined based on the Redundancy Version (RV) field and the HARQ ID of the first DCI.

Furthermore, in the present disclosure, the first DCI includes information for a trigger of Aperiodic-Channel State Information (AP-CSI) and a UL-SCH indicator field.

Furthermore, in the present disclosure, the first DCI triggers the AP-CSI, and a value of the UL-SCH indicator field is 0.

Furthermore, in the present disclosure, when the UL grant is not included in the first DCI, the first DCI further includes a field related to a transmission of a Transport Block (TB), and the field related to a transmission of a TB indicates at least one of information related to a Bandwidth part (BWP) switching and information related to a Physical Downlink Control Channel (PDCCH) monitoring.

Furthermore, in the present disclosure, the information related to a BWP is a period of the BWP switching, and the information related to a PDCCH monitoring is a skip period of the PDCCH monitoring.

Furthermore, in the present disclosure, the information related to a PDCCH monitoring is information for changing a search space of the PDCCH monitoring.

Furthermore, in the present disclosure, the information related to a PDCCH monitoring is a search period of the PDCCH monitoring.

Furthermore, in the present disclosure, when the NDI field is identified to be related to the HARQ-ACK of the uplink data, the method further includes deleting the information related to uplink data.

Furthermore, in the present disclosure, a user equipment for receiving an explicit HARQ-ACK through Downlink Control Information (DCI) in a wireless communication system includes a Radio Frequency (RF) module for transmitting and receiving a wireless signal; and a processor functionally connected to the RF module, wherein the processor is configured to: transmit, to a base station, an uplink data; and receive, from the base station, first DCI for the uplink data, wherein the first DCI includes a New Data Indicator (NDI) field indicating a transmission or retransmission of the uplink data, wherein the first DCI is determined by DCI related to HARQ-ACK of the uplink data on whether the first DCI includes a UL grant, and when the first DCI is determined to be the DCI related to HARQ-ACK of the uplink data, wherein the NDI field is identified to be related to the HARQ-ACK of the uplink data.

Furthermore, in the present disclosure, when the UL grant is not included in the first DCI, the NDI field is identified to be related to the HARQ-ACK of the uplink data, and when the UL grant is included in the first DCI, the NDI field is identified to be related to whether a new data is transmitted.

Furthermore, in the present disclosure, when the NDI field is identified to be related to the HARQ-ACK of the uplink data, a field value of the NDI field is dropped.

Furthermore, in the present disclosure, when the NDI field is identified to be related to the HARQ-ACK of the uplink data, a field value of the NDI field has a fixed value.

Furthermore, in the present disclosure, when the NDI field is identified to be related to whether a new data is transmitted, a field value of the NDI field is stored in a specific entity.

Furthermore, in the present disclosure, when the UL grant is not included in the first DCI, the first DCI further includes a Redundancy Version (RV) field and HARQ ID information, and the HARQ-ACK of the uplink data is determined based on the Redundancy Version (RV) field and the HARQ ID of the first DCI.

Furthermore, in the present disclosure, a method for transmitting an explicit HARQ-ACK through Downlink Control Information (DCI) in a wireless communication system performed by a base station includes receiving, from a user equipment, an uplink data; and transmitting, to the user equipment, first DCI for the uplink data, wherein the first DCI includes a New Data Indicator (NDI) field indicating a transmission or retransmission of the uplink data, wherein the first DCI is determined by DCI related to HARQ-ACK of the uplink data on whether the first DCI includes a UL grant, and when the first DCI is determined to be the DCI related to HARQ-ACK of the uplink data, wherein the NDI field is identified to be related to the HARQ-ACK of the uplink data.

Advantageous Effects

According to the present disclosure, there is an effect that an explicit HARQ-ACK feedback may be transmitted using DCI fields which have been not used in an existing specific situation.

Furthermore, through an explicit HARQ-ACK feedback transmission, there is an effect that that a user equipment does not perform unnecessary repeated transmission and a power consumption and interference with another user equipment may be reduced.

Furthermore, additional information is provided by using DCI fields which have been not used in an existing specific situation, and there is an effect that signaling overhead may be reduced.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompany drawings, which are included as part of the detailed description in order to help understanding of the present invention, provide embodiments of the present invention and describe the technical characteristics of the present invention along with the detailed description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates an example of an overall structure of a NR system to which a method proposed by the present specification is applicable.

FIG. 5 illustrates a relation between an uplink frame and a downlink frame in a wireless communication system to which a method proposed by the present specification is applicable.

FIG. 6 illustrates an example of a resource grid supported in a wireless communication system to which a method proposed by the present specification is applicable.

FIG. 7 illustrates examples of a resource grid per antenna port and numerology to which a method proposed by the present specification is applicable.

FIG. 8 illustrates a self-contained subframe structure in the wireless communication system to which a method proposed by the present disclosure is applicable.

FIG. 9 is a flowchart illustrating an operation method of a UE that performs a method of receiving DCI including HARQ-ACK information proposed in the present disclosure.

FIG. 10 is a flowchart illustrating a base station operation method for transmitting DCI including HARQ-ACK information proposed in the present disclosure.

FIG. 11 illustrates a wireless communication device to which methods described in the present disclosure are applicable.

FIG. 12 illustrates another example of a block configuration diagram of a wireless communication device to which methods described in the present disclosure are applicable.

MODE FOR DISCLOSURE

Hereinafter, preferred embodiments of the present disclosure will be described in detail with reference to the accompanying drawings. A detailed description to be disclosed below together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details.

In some cases, in order to avoid that the concept of the present disclosure becomes vague, known structures and devices are omitted or may be shown in a block diagram form based on the core functions of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/NR is primarily described for clear description, but technical features of the present invention are not limited thereto.

In the present disclosure, 'A/B' or 'A and/or B' can be interpreted in the same sense as 'including at least one of A or B'.

Hereinafter, examples of 5G use scenarios to which a method proposed in this specification may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one subcarrier spacing in a frequency domain. By scaling a reference subcarrier spacing by an integer N, different numerologies can be defined.

NR: NR Radio Access or New Radio

System General

FIG. 4 illustrates an example of an overall structure of a new radio (NR) system to which a method proposed by the present specification is applicable.

Referring to FIG. 4, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$. Downlink and uplink transmissions are organized into radio frames with a duration of $T_f=N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

FIG. 5 illustrates a relation between a UL frame and a DL frame in a wireless communication system to which a method proposed by the present disclosure is applicable.

As illustrated in FIG. 5, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0 \ldots, N_{subframe}^{slots,\mu}-1\}$ within a subframe, and are numbered in increasing order of $n_{s,f}^\mu \in \{0 \ldots, N_{subframe}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots s in a subframe is aligned in time with the start of OFDM $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

TABLE 2

| | Slot configuration | | | | | |
|---|---|---|---|---|---|---|
| | 0 | | | 1 | | |
| | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |

TABLE 2-continued

| | Slot configuration | | | | | |
|---|---|---|---|---|---|---|
| | 0 | | | 1 | | |
| $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 6 illustrates an example of a resource grid supported in a wireless communication system to which a method proposed by the present specification is applicable.

Referring to FIG. 6, a resource grid consists of $N_{RB}^{\mu}N_{sc}^{RB}$ subcarriers in a frequency domain, each subframe consisting of $14 \cdot 2^{\mu}$ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 7, one resource grid may be configured for the numerology $\mu$ and an antenna port p.

FIG. 7 illustrates examples of a resource grid per antenna port and numerology to which a method proposed by the present specification is applicable.

Each element of the resource grid for the numerology $\mu$ and the antenna port p is indicated as a resource element, and may be uniquely identified by an index pair (k,l) Herein, k=0, . . . , $N_{RB}^{\mu}N_{sc}^{RB}-1$ an index in the frequency domain, and l=0, . . . , $2^{\mu}N_{symb}^{(\mu)}-1$ indicates a location of a symbol in a subframe. To indicate a resource element in a slot, the index pair (k, l̄) is used. Herein, l=0, . . . , $N_{symb}^{\mu}-1$.

The resource element (k, l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ consecutive subcarriers on a frequency domain. On the frequency domain, physical resource blocks are numbered from 0 to $N_{RB}^{\mu}-1$. A relation between a physical resource block number $n^{PRB}$ on the frequency domain and the resource elements (k, l) is given by Equation 1.

$$n_{PRB} = \left\lfloor \frac{k}{N_{sc}^{RB}} \right\rfloor \qquad \text{[Equation 1]}$$

In regard to a carrier part, a UE may be configured to receive or transmit the carrier part using only a subset of the resource grid. In this instance, a set of resource blocks which the UE is configured to receive or transmit are numbered from 0 to $N_{URB}^{\mu}-1$ on the frequency domain.

Self-Contained Slot Structure

In order to minimize data transmission latency in a TDD system, 5th generation (5G) new RAT (NR) considers a self-contained subframe structure as illustrated in FIG. 8.

That is, FIG. 8 illustrates an example of a self-contained structure to which a method proposed by the present disclosure is applicable.

In FIG. 8, a hatched portion 810 represents a downlink control area, and a black portion 820 represents an uplink control area.

A non-hatched portion 830 may be used for downlink data transmission or for uplink data transmission.

Such a structure is characterized in that DL transmission and UL transmission are sequentially performed in one slot, and the transmission of DL data and the transmission and reception of UL ACK/NACK can be performed in one slot.

The slot described above may be defined as 'self-contained slot'.

That is, through such a slot structure, a base station can reduce the time it takes to retransmit data to a UE when a data transmission error occurs, and hence can minimize a latency of final data transfer.

In the self-contained slot structure, a time gap is necessary for the base station and the UE to switch from a transmission mode to a reception mode or to switch from the reception mode to the transmission mode.

To this end, some OFDM symbols at a time of switching from DL to UL in the self-contained slot structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Different from the existing system, a next generation system (e.g., 5G) uses downlink control information (DCI) of a physical downlink control channel (PDCCH) only without a physical HARQ indicating channel (PHICH) for a HARQ operation of uplink (UL) transmission. This enables a HARQ operation of a UL transmission to operate based on a PUSCH scheduling message.

Meanwhile, a traffic of a URLLC transmission has sporadic characteristics of a small size generally, and a UE has unexpected long unexpected packet arrival time and a small packet size. If a single packet size is smaller than a multiple Transport Block (TB) size, a UE using a URLLC transmission does not transmit multiple TBs consecutively in a single HARQ process. In this case, there is a problem that the use of DCI including a PUSCH resource allocation for all times for a HARQ operation increases a system overhead and causes power consumption of a UE owing to an unnecessary transmission.

For this, it is required to transmit an explicit HARQ-ACK feedback to DCI. Accordingly, methods of transferring a HARQ process feedback without unnecessary PUSCH resource allocation have been considered by preconfiguring (predetermining) a meaning for specific values of DCI fields such that a corresponding specific field value or a combination of the corresponding specific field values transmit a HARQ-ACK state only, not a PUSCH resource allocation. However, the method has a problem that DCI of dozens of bits needs to be transmitted for a HARQ-ACK feedback of 1 bit, consequently.

Accordingly, in order to use the overhead occurs as such usefully, in the case that a UE receives a HARQ-ACK feedback through DCI, the present disclosure proposes a method and procedure for the UE to receive other information than the HARQ-ACK feedback.

That is, the present disclosure describes a method and procedure of interpreting information of DCI in the process for a UE to receive a HARQ-ACK feedback through DCI of a PDCCH.

In addition, the meaning of information for a PUSCH resource allocation may be the same as a UL grant.

In the case that there is no explicit HARQ-ACK (e.g., PHICH) of a base station for an uplink transmission of a UE, the UE expects scheduling DCI that indicates a retransmission for a specific uplink transmission and monitors it.

At this time, in the case that the UE is unable to receive the scheduling DCI from the base station during a specific period, the UE flushes a HARQ buffer for a TB used for the uplink transmission.

In this case, the flushing of a HARQ buffer may be interpreted as deleting the TB used for the uplink transmission, that is, information related to data used for the uplink transmission.

Meanwhile, in the case that a base station correctly receives for a specific uplink transmission and transmits a HARQ-ACK signal explicitly to a UE, the UE may empty a HARQ-ACK buffer immediately after receiving the HARQ-ACK signal, and further, is not required to perform a monitoring for retransmission DCI. Furthermore, in the case that the UE receives an explicit HARQ-ACK from the base station while performing an uplink repeated transmission, the UE does not perform a remaining unnecessary repeated transmission, and accordingly, power consumption and interference with another UE may be reduced.

With respect to DCI for transmitting an explicit HARQ-ACK feedback, existing UE-specific DCI may be reused, new group-common DCI may be designed, or new UE-specific DCI may be designed.

In the present disclosure, the case that existing UE-specific DCI is reused and a HARQ-ACK is transmitted is mainly described, but this is also applicable to a new DCI design.

In the case that packets of a small size as in the URLLC service arrives sporadically, the situation that does not require a new scheduling is required after a specific scheduling is more typical. In the case that a base station is intended to indicate just a correct reception of an uplink transmission, not the purpose of retransmission for a specific TB to a UE, a specific field (e.g., fields related to a resource allocation, a transmission, etc.) may not be unnecessary.

Therefore, the present disclosure describes a method and procedure for a UE to interpret a DCI field that becomes unnecessary in the DCI for indicating an explicit HARQ-ACK differently as previously and to receive useful information.

Furthermore, the present disclosure describes a detailed method for a UE to use a value related to a HARQ process (e.g., HARQ process number, NDI field value, etc.) in the process of receiving DCI that indicates an explicit HARQ-ACK from a base station.

This is briefly described as below.
1. A UE may receive PUSCH scheduling DCI from a base station and may assume that an RNTI in this case is the same as the RNTI used in the DCI that indicates a retransmission.
2. In the case that DCI received by a UE satisfies a specific code point, this may be DCI that indicates an explicit HARQ-ACK, not scheduling DCI.
3. In the case that a UE receives an explicit HARQ-ACK,
A. different DCI field interpretation may be applied to other field except a code point of the explicit HARQ-ACK,
B. a separate UE operation may be performed based on information for an interpretation of the other field.

In a next generation system, depending on an application field or a type of traffic, there are various units for a reference time which is assumed/used for transmitting and receiving a physical channel. The reference time may be a basic unit for base station/UE to schedule a specific physical channel, and the unit of the reference time may be changed depending on the number of symbols that configure a corresponding scheduling unit and/or subcarrier spacing.

In the present disclosure, for the convenience of description, a unit of reference time is described based on a slot or non-slot.

In this case, a slot may be a basic unit of scheduling used for a general traffic data (e.g., enhanced mobile broadband (eMBB)). A non-slot may be a unit of which time duration is smaller than a slot in a time domain and may be a basic unit of scheduling used in a traffic of a specific purpose or communication scheme (e.g., Ultra reliable and low latency communication (URLLC), an unlicensed band, or a millimeter wave, etc.).

However, this is just an example, and the methods proposed in the present disclosure are applicable to the case that a physical channel is transmitted and received based on a non-slot in eMBB or the case that a physical channel is transmitted and received based on a slot URLLC or other communication scheme.

In the present disclosure, a radio resource or a resource may be distinguished with each other according to a multiple access scheme such as a spreading code, a scrambling code, an interleaving pattern, a power allocation as well as time/frequency resource.

In addition, the methods (embodiments) proposed in the present disclosure is described with respect to a transmission of uplink channel/signal or downlink channel/signal, but not limited thereto, and extendible to other wireless transmissions.

Hereinafter, it is described DCI that indicates a HARQ-ACK feedback of a base station for an uplink transmission of a UE.

(Method 1)—Explicit HARQ-ACK Indication for SPS/CS

Method 1 is an explicit HARQ-ACK indication method for semi-persistent scheduling (SPS)/configured scheduling (CS).

In designing DCI that indicates a HARQ-ACK feedback without an allocation of an existing PUSCH resource, it has been discussed the case that there is no RA value (field) in a resource allocation (RA) field (e.g., All 0's for bitmap RA type) or an unused value is used (e.g., All 1's for RIV RA type). However, these values are already used for distinguishing deactivation of SPS/CS.

Next is a code point used in release of SPS/CS applied to DCI.

TABLE 4

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

When considering that Activation/deactivation of SPS/CS is transferred to fallback DCI that indicates an NDI field value is 0, the following methods may be considered for a HARQ-ACK feedback used in the SPS/CS.

First, in this method, when transmitting a HARQ-ACK feedback, an NDI field value of 1 or an NDI field value which is not toggled in a previous value is used, and a code point similar to a SPS/CS release is applied. In this case, the HARQ process number field may not be used for a code point. This is for specifying a HARQ process.

Table 5 represents an example of a code point when fallback DCI is used.

TABLE 5

| DCI format | For SPS/CS release (with NDI 0) | | For explicit HARQ-ACK indication (with NDI 1) | |
|---|---|---|---|---|
|  | DCI format 0_0 | DCI format 1_0 | DCI format 0_0 | DCI format 1_0 |
| HARQ process number | set to all '0's | set to all '0's | — | — |
| Redundancy version | set to '00' | set to '00' | set to '00' | set to '00' |
| Modulation and coding scheme | set to all '1's | set to all '1's | set to all '1's | set to all '1's |
| Resource block assignment | set to all '1's | set to all '1's | set to all '1's | set to all '1's |

Referring to Table 5, an NDI field value 0 is used for a release of SPS/CS, and an NDI field value 1 is used for an explicit HARQ-ACK indication.

Alternatively, when transmitting a HARQ-ACK feedback, a different code point in the same field as an SPS/CS release or simultaneously, an additional code point may be applied. For the different code point, the field value represented in Table 6 for each field of an SPS/CS release may be considered.

TABLE 6

HARQ = Actual HARQ ID
RV = '11'
MCS = all '0' or other reserved value
other than all '1's(e.g., '11110' or '11101')
RB assignment =
for bitmap RA, set to all '0's
for RIV RA method, set to all '1's or set to all '1's except for LSB Table 7 represents an example of a code point when fallback DCI is used.

TABLE 7

| DCI format | For SPS/CS release | | For explicit HARQ-ACK indication | |
|---|---|---|---|---|
|  | DCI format 0_0 | DCI format 1_0 | DCI format 0_0 | DCI format 1_0 |
| HARQ process number | set to all '0's | set to all '0's | — | — |
| Redundancy version(RV) | set to '00' | set to '00' | set to '11' | set to '11' |
| Modulation and coding scheme (MCS) | set to all '1's | set to all '1's | set to all '0's | set to all '0's |
| Resource block assignment (RA) | set to all '1's | set to all '1's | set to all '1's | set to all '1's |

Referring to Table 7, between DCI for an SPS/CS release and DCI for an explicit HARQ-ACK indication, Redundancy versions and MCS fields are different.

That is, different code points are used depending on release and MCS fields values. Alternatively, DCI received according to a combination of specific RV/MCS field values may be regarded as DCI for an explicit HARQ-ACK indication.

In other words, this may mean it may be distinguished on whether DCI received by a UE is DCI for an SPS/CS release or DCI for an explicit HARQ-ACK indication with a specific combination of an RV value and an MCS value.

In addition, as represented in Table 8, in order to increase the reliability of a code point of a HARQ-ACK, a code point value of an additional field may be used.

Table 8 is a table representing an example of an additional code point.

TABLE 8

TPC command
Time-domain RA
SRS resource indicator
Precoding information and number of layers (e.g., reserved states)
Antenna ports (e.g., reserved states)
SRS request
CBGTI
PTRS-DMRS association
beta offset indicator
DMRS sequence initialization Meanwhile, when a UE receives DCI for an SPS/CS release, the UE may flush a buffer by assuming that the UE receives a HARQ-ACK for a transmission for the corresponding SPS from a base station. This may reduce an ambiguity in the case that a Bandwidth Part (BWP) switching occurs and an SPS/CS configuration is changed.

(Method 2)—Explicit HARQ-ACK Indication with CSI Triggering

Method 2 is a method of interpreting whether it is DCI indicating an explicit HARQ-ACK by considering a CSI trigger.

A base station may trigger CSI without a UL-SCH in the case of combining a HARQ-ACK feedback with useful information simultaneously, for example, combining a HARQK ACK with a CSI trigger without a UL-SCH or transmitting a HARQ-ACK only, the base station may trigger CSI without UL-SCH. In the case that both of two operations of HARQ-ACK and AP-CSI triggers are triggered, the use of the code points, particularly, an RA field as a code point may be difficult. Accordingly, in order to support the operation, methods of not using an RA field as a code point will be described.

Considering all of PUSCH transmission, CSI transmission and HARQ-ACK transmission simultaneously, the following cases may be existed: the case that common DCI is for a normal UL-SCH scheduling, the case common DCI is for CSI transmission and UL-SCH (UL-SCH with CSI), the case that common DCI is for a UL-SCH without CSI transmission (CSI without UL-SCH), the case that common DCI is for UL HARQ-ACK only, and the case that common DCI is for CSI transmission and UL HARQ-ACK (CSI with UL HARQ-ACK).

Hereinafter, detailed methods of not using an RA field of DCI as a code point are described.

(Method 2-1)

In the case that AP-CSI is triggered and there is no UL-SCH in DCI, a UE may interpret HARQ-ACK code points differently.

The UE operation is as described below in the case that AP-CSI is triggered by DCI received by the UE and a UL-SCH indicator is 'disabled'.

i) In the case that a HARQ ID of DCI is non-zero, it may be assumed that an indication of the DCI also includes a HARQ-ACK.

In other words, in the case that AP-CSI is triggered previously and a UL-SCH indicator is 'disabled', since the DCI is for a CSI transmission, no specific determination is made (default is the case that a HARQ ID value is 0).

Therefore, a UE may use a HARQ ID value which is not used for a specific purpose as a code point indicating the information for a HARQ-ACK.

In the case that only AP CSI transmission without a UL-SCH is purpose, a HARQ ID may be set to 0.

ii) A UE may determine whether DCI includes a HARQ-ACK by considering an RV field of the DCI received from a base station.

In the case that a UL-SCH PUSCH transmission is not performed through a UL-SCH indicator, since a TB is not transmitted, it is not required to consider an RV value. Accordingly, the RV field may be used as a flag of an explicit HARQ-ACK.

For example, in the case that a value of the RV field indicates a specific value (e.g., '01'), a UE may interpret the case as indicating a HARQ-ACK for specific TB/CB/CBG, the UE may flush a HARQ process buffer corresponding to the case.

That is, even in the case that DCI triggers AP-CSI according to a specific combination of a HARQ ID and an RV field value, a HARQ-ACK transmission may be piggy-backed.

Meanwhile, in the case that a UL-SCH indicator of DCI is 'disabled' and AP-CSI is also not triggered (e.g., "absence of CSI request field or zero value"+disable UL-SCH indicator), it may be determined whether to transmit a HARQ-ACK according to the code point proposed in method 1 described above.

Method 2-1 is a method of reusing a DCI field which is not used in a specific situation and using it for indicating a HARQ-ACK.

In other words, in the case that DCI is to trigger a CSI transmission, since an RV field and a HARQ ID are not used, in this case, the unused RV field and HARQ ID may be used for indicating HARQ-ACK information.

(Method 2-2)

This is the method for a UE to use the case that DCI received from a base station does not trigger AP-CSI and performs a resource allocation for a UL-SCH as an additional code point of a HARQ-ACK.

In other words, in the case that AP-CSI is not triggered by DCI (e.g., absence of CSI request field or zero value) but a UL-SCH indicator is 'enabled', an indication of the DCI may be assumed to include a HARQ-ACK.

In this case, a UE may interpret the received DCI indicates a HARQ-ACK for specific TB/CB/CBG and may flush a HARQ process buffer corresponding to it. In this case, additionally, it may be determined whether to perform a HARQ-ACK transmission according to the code point of method 1 described above. In addition, reliability may be increased by using the case that an AP-CSI value is 0 and a UL-SCH value is 1 in addition to the code point.

Furthermore, SPS release and HARQ-ACK may be distinguished by using the same code point as the SPS release and the corresponding bit fields. This may simplify a system operation by operating a CSI trigger and an explicit HARQ-ACK indication mutually exclusively. The PUSCH resource allocation included in the DCI may be used for transferring other UCI or disregarded for power consumptions of the UE. In addition, in order to disregard a PUSCH resource allocation, an RA field is not used (No RA) or an unused value may be used.

Table 9 is a table representing an example of the code point proposed in method 2 above.

TABLE 9

| | Normal UL-SCH | UL-SCH with CSI trigger | CSI only without UL-SCH | UL HARQ-ACK only | CSI with UL HARQ-ACK |
|---|---|---|---|---|---|
| CSI report field | Absent or set to all '0's | Any valid value other than all '0' | Any valid value other than all '0' | Absent or set to all '0's | Any valid value other than all '0' |
| UL-SCH indicator field | '1' | '1' | '0' | '0' | '0' |
| RV | — | — | '00' | '11' | '11' |

Referring to Table 9 above, in the case of transmitting a HARQ-ACK only in DCI, there is no CSI report field itself, or the CSI report field is set to 0, and a UL-SCH indication field is set to 0, and in this case, an RV field may be set to 11.

In other words, in the case that a CSI report is not triggered (the case that a CSI report field is 0), since a UL-SCH indication field is set to 1 for all cases conventionally, the case that a UL-SCH indication field becomes 0 is not assumed.

Accordingly, in the present disclosure, when a CSI report is not triggered, the case that a UL-SCH indication field becomes 0 is used for a code point to indicate a HARQ-ACK.

Furthermore, in the case that DCI indicates a CSI trigger and a HARQ-ACK together, a CSI report field is set to 0, a UL-SCH indication field is set to 0, and an RV field may be set to 11.

The whole or a part of the code points of Table 9 and the code point of method 1 described above may be simultaneously applied.

(Method 3)—Transferring Additional Useful Information by Explicit HARQ-ACK

This is a method of transmitting additional useful information in the case that DCI transmitted from a base station to a UE indicates an explicit HARQ-ACK.

As described above, an explicit HARQ-ACK feedback through DCI does not indicate a TB transmission. Accordingly, other fields related to a TB transmission are not used.

For example, in the case that an explicit HARQ-ACK feedback is indicated together with a CSI report trigger through DCI, the fields related to a TB transmission may be used for a field for transmitting useful information to a UE. Alternatively, a separate DCI format design may be considered for an explicit HARQ-ACK for the information.

In other words, in the case that DCI transmitted by a base station indicates an explicit HARQ-ACK, other fields in addition to the field used for a code point may be used for transmitting the useful information or reinterpreted as other information.

For example, fallback DCI does not have a BWP index field and may require a BWP switching (zero RA BWP switching). In this case, a specific field may be used for BWP index indication. For this, uplink/downlink and/or uplink/downlink BWP switching may be indicated, and 3 to 4 bits may be required.

In one example, a bit value of Time Domain Resource Assignment (TDRA) field indicated by the DCI may represent a BWP switching period in a symbol level or a slot level.

In another example, the shortest value in the TDRA field or the shortest value of the BWP switching periods supported by a UE may be used, or the position of a starting symbol indicated by the entry of the TDRA table indicated by the TDRA field may be determined to be an end time of the BWP switching.

Through the DCI field applicable to transfer the useful information, the following additional information may be transferred.

1) DCI may indicate a BWP switching period. That is, DCI may configure a BWP switching time or a duration after switching.

2) For power saving, a PDCCH monitoring skip period may be indicated. That is, DCI may indicate/configure whether a UE may skip a PDCCH monitoring during a specific time.

The fact that a base station does not allocate an additional uplink transmission to a UE may mean the case that there is no remaining uplink buffer in the UE in the aspect of the base station. In this case, the base station may not send an additional uplink grant until the UE requests a scheduling for an uplink transmission.

Accordingly, in this case, in order to reduce unnecessary power consumption of a UE, a PDCCH monitoring may be restricted. On the contrary, in order to reduce downlink latency of a UE, a base station may transfer information related to a downlink buffer that the UE is going to receive and differently configure a PDCCH monitoring according to the corresponding information.

The detailed configuration is as below.

2-1) A base station may configure/indicate a PDCCH monitoring skip period in a slot or symbol level through DCI transmitted to a UE.

2-2) A base station may configure/indicate to perform a discontinuous PDCCH monitoring in a Discontinuous Reception (DRX) operation, a similar operation to the DRX operation, or a similar operation as a power saving mode through DCI transmitted to a UE. In this case, the DRX operation or the performance of a discontinuous PDCCH monitoring may operate without regard to a timer of a higher layer.

In one example, a UE may monitor a CORESET which is predetermined on a time when a UE receives DCI or received and/or a search space in a longer period only during a specific time. In this case, the period may be the Nth times of the previously configured period. In this case, N may be predetermined or transferred through a higher layer signaling or layer 1 (L1) signaling. Alternatively, when a UE receives such a signaling, a UE operation may be indicated/configured through a separate RRC signaling.

2-3) A base station may configure/indicate to change a search space configuration to monitor during a predetermined time through DCI transmitted to a UE. In this case, the base station may indicate an ID for a search space configuration through different field of DCI or indicate a predetermined search space set. Meanwhile, the predetermined search space set may be configured by a higher layer.

In this case, a plurality of search space sets is predetermined or configured by a higher layer, DCI may indicate an index of the search space set. Alternatively, DCI may indicate/configure to reduce the number of search space candidates or change a search space selection priority.

3) When a UE performs an uplink transmission using a predetermined configuration like SPS/configured grant, and a base station receives an explicit HARQ-ACK in response to this, other fields of DCI transmitted from the base station may be utilized as a modification message of the corresponding SPS/configured grant.

For example, the SPS/configured grant configuration may be changed through an MCS field received simultaneously with an explicit HARQ-ACK included in DCI, a DMRS related field and/or an RA field value.

When a base station transmits a HARQ-ACK using retransmission DCI in which a PUSCH resource is not allocated, that is, DCI in which an RA field is not existed (No RA) and of which NDI field value is set to 1, in the case that an MCS field value indicates a specific value, not in a reserved state, the corresponding MCS field value may be used for SPS/CS configuration. Alternatively, in the case that a UE receives a feedback for a HARQ-ACK through DCI of which UL-SCH indicator (field) is '0' and DCI in which a CSI request field is not existed or set to 0, the UE may modify SPS/CS configuration with a received valid MCS, a field related to DMRS and/or a valid RA field value.

In this case, in considering the case that a UE is unable to receive DCI, the modification may be applied temporarily during a predetermined time.

3-1) An explicit HARQ-ACI is utilized as a configuration modification message, a confirmation to the DCI may be separately transferred by using a higher layer signaling. The process of modifying SPS/CS through the confirmation may be similar to (re-)activation process, but a structural modification of the SPS (re-)activation process is difficult to configure a HARQ-ACK.

Table 10 represents a code point used in SPS activation.

TABLE 10

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

In order for SPS (re-)activation and a HARQ-ACK share through DCI, a specific field among the fields which are not used for (re-)activation indication needs to be used to transmit a HARQ process ID.

In this case, DCI should be designed to include a configuration for SPS (re-)activation in a code point used for a HARQ-ACK transmission through DCI or the fact that SPS (re-)activation configuration is transmitted together by using an additional field based on a code point used for a HARQ-ACK transmission should be informed to a UE.

4) A base station may indicate a power saving mode through DCI. In the case that a UE supports several power saving modes, DCI may include information for an indicator for supporting a specific mode.

5) DCI transmitted to a base station may be transmitted with being coupled with a MAC Control Element (MAC CE) that modifies a Transmission Configuration Indication (TCI) state or a specific MAC CE.

6) A base station may transmit DCI with additional information for a downlink buffer state for a UE that receives the DCI. The UE may modify a parameter for monitoring or BWP according to the additional information or perform an application of power saving mode.

The methods (examples) describes an additional application method for a specific DCI field, for the convenience of description, but the same method or a method for reinterpreting a DCI field may also be applicable to different reusable DCI field.

(Method 4)—NDI Handling of Explicit HARQ-ACK Indication

The NDI value described below may be the same as the value which is configured in an NDI field in DCI.

Method 4 relates to a method of handling an NDI value included in DCI in the case that explicit HARQ-ACK information is transmitted through the DCI.

In order to identify a HARQ process and a TB indicated by DCI accurately, a UE may use the number of HARQ processes and an NDI value simultaneously. In this case, in the case that a UE receives an NDI value from scheduling DCI, the UE may transfer the NDI value to a HARQ entity and may determine whether to flush or reuse a corresponding HARQ process buffer.

However, in the case that the DCI indicating an explicit HARQ-ACK includes an NDI field value configured to specify a TB, a UE does not perform a PUSCH transmission for the corresponding DCI. Accordingly, the case of being unable to receive (missing) DCI may occur.

A UE determines whether to perform a retransmission of a previous transmission or a new transmission based on whether an NDI field included in DCI transmitted by a base station is toggled, and a problem of being unable to receive DCI including HARQ-ACK information may occur.

For example, with respect to a HARQ process of which NDI value is 0, when a base station transmit DCI including an explicit HARQ-ACK that flushes a HARQ buffer of a UE by setting an NDI field value to 1, there may be a case that the UE is unable to receive (misses) the DCI.

That is, this is the case that a base station transmits HARQ-ACK information through DCI of which NDI field value to 1 in response to a transmission for an uplink data transmitted by a UE, but the UE fails to receive it.

In this case, in the case that the base station transmits scheduling DCI by setting an NDI field value to 0 to the UE for a new transmission for the same HARQ process, the UE may determine the corresponding DCI to be a retransmission of the previous HARQ process and perform an operation.

Since the base station transmits DCI of which NDI field value is 1 as a HARQ-ACK feedback, the base station transmits DCI of which NDI field value is 0 for a new transmission. However, since the UE fails to receive the DCI of which NDI field value to 1, the UE still stores an NDI field value as 0. Accordingly, the same NDI field value (0) is received in the aspect of UE, the UE recognizes it as a retransmission of a previous HARQ process. This may be unexpected operation of the UE.

Therefore, when a base station transmits DCI including explicit HARQ-ACK information, it is required a method of handling an NDI field value considering the case that a UE fails to receive the DCI.

Hereinafter, a specific method of handling an NDI field value is described.

1) When a UE receives DCI that forwards only a HARQ-ACK feedback without a resource allocation for an actual PUSCH transmission, information of the DCI may not be transferred to a HARQ entity or may not change an NDI value of a previous HARQ process.

Here, the fact that the information of the DCI is not transferred to a HARQ entity may mean a drop of an NDI field value.

In other words, when the NDI field is identified for a new transmission, in this case, a value of the NDI field may be stored as a HARQ entity.

That is, DCI of section 1) may distinguish normal scheduling DCI from DCI including explicit HARQ-ACK information in a higher layer operation (e.g., operation in MAC). For this, in an L1 operation, two types of DCI may be distinguished by using a certain criterion.

2) In the case that a HARQ process buffer is flushed through DCI including explicit HARQ-ACK information, DCI for scheduling a new transmission in a flushed HARQ process may have the same NDI field value as the NDI value of the explicit HARQ-ACK.

In other words, after a HARQ-ACK of the DCI including explicit HARQ-ACK information is transferred to a HARQ entity, in the case that a UL grant having the same NDI value as the NDI field value of the DCI, the explicit HARQ-ACK information included in the UL grant may be disregarded.

3) DCI including explicit HARQ-ACK information may use the same value as the value of transmitting the NDI field value of the DCI for a HARQ-ACK buffer flushing.

That is, NDI values may be the same for a retransmission of a HARQ process of previously transmitted DCI and DCI including explicit HARQ-ACK information. In this case, as a code point of the explicit HARQ-ACK, it may be assumed that an NDI is the same as a previously transmitted value.

The case of section 3) described above may be mostly applied to the case that an initial transmission is generated by a UL grant, and in the case that an initial transmission is generated by a configured grant, it may be assumed that an NDI value is a specific value (0 or 1) at all times.

4) An NDI field value including explicit HARQ-ACK information may always be set to a specific value without regard to a previous transmission.

In other words, with a specific NDI value as a code point of an explicit HARQ-ACK, in the case that an NDI value of DCI received by a UE satisfies a code point of the HARQ-ACK, an indicated HARQ process buffer may be flushed.

That is, the NDI field of DCI including explicit HARQ-ACK information may not be used to determine whether there is a transmission of a new data and may also not be forwarded to a HARQ entity.

In the case of using method 1 to method 4 described above, in the process that a UE receives a HARQ-ACK feedback through DCI, there is an effect that an influence exerted by other L1 signaling operation may be minimized and signaling overhead may be reduced.

In addition, when the DCI including explicit HARQ-ACK information is received, additional information may be additionally received, and there is an effect that more efficient UE operation may be performed.

FIG. 9 is a flowchart illustrating an operation method of a UE that performs a method of receiving DCI including HARQ-ACK information proposed in the present disclosure.

That is, FIG. 9 shows an operation method of a UE that performs a method of receiving an explicit HARQ-ACK through Downlink Control Information (DCI).

First, a UE transmits an uplink data to a base station (step, S910).

Then, the UE receives first DCI for the uplink data from the base station (step, S920).

In this case, the first DCI includes a New Data Indicator (NDI) field indicating a transmission or retransmission of the uplink data.

Furthermore, the first DCI is determined by DCI related to HARQ-ACK of the uplink data on whether the first DCI includes a UL grant.

In this case, when the first DCI is determined to be the DCI related to HARQ-ACK of the uplink data, the NDI field is identified to be related to the HARQ-ACK of the uplink data.

In addition, in the case that the NDI field is identified to be related to the HARQ-ACK of the uplink data, the UE deletes information related to the uplink data stored in a MAC buffer (step, S930).

In this case, step S930 is not an essential step, and step S930 may be performed when the UE receives information for a new transmission from the base station later.

That is, after the UE may receive information for a new transmission from the base station, the UE may delete the information related to the uplink data stored in a MAC buffer.

In this case, when the UL grant is not included in the first DCI, the NDI field is identified to be related to the HARQ-ACK of the uplink data, and when the UL grant is included in the first DCI, the NDI field is identified to be related to whether a new data is transmitted.

In addition, when the NDI field is identified to be related to the HARQ-ACK of the uplink data, a field value of the NDI field may be dropped.

Furthermore, when the NDI field is identified to be related to the HARQ-ACK of the uplink data, a field value of the NDI field may be a fixed value.

In addition, when the NDI field is identified to be related to whether a new data is transmitted, a field value of the NDI field may be stored in a specific entity.

Furthermore, when the UL grant is not included in the first DCI, the first DCI may further include a Redundancy Version (RV) field and HARQ ID information, and the HARQ-ACK of the uplink data may be determined based on the Redundancy Version (RV) field and the HARQ ID of the first DCI.

In addition, the first DCI may include information for a trigger of Aperiodic-Channel State Information (AP-CSI) and a UL-SCH indicator field.

Furthermore, the first DCI may trigger the AP-CSI, and a value of the UL-SCH indicator field may be 0.

In addition, when the UL grant is not included in the first DCI, the first DCI may further include a field related to a transmission of a Transport Block (TB), and the field related to a transmission of a TB may indicate at least one of information related to a Bandwidth part (BWP) switching and information related to a Physical Downlink Control Channel (PDCCH) monitoring.

In this case, the information related to a BWP may be a period of the BWP switching, and the information related to a PDCCH monitoring may be a skip period of the PDCCH monitoring.

Furthermore, the information related to a PDCCH monitoring may be information for changing a search space of the PDCCH monitoring.

In addition, the information related to a PDCCH monitoring may be a search period of the PDCCH monitoring.

With reference to FIG. 11 and FIG. 12, it is described the contents of the method for receiving DCI including HARQ-ACK information proposed in the present disclosure, implemented by a UE.

A UE that receives an explicit HARQ-ACK through Downlink Control Information (DCI) in a wireless communication system includes a Radio Frequency (RF) module for transmitting and receiving a wireless signal and a processor functionally connected to the RF module.

First, the processor of the UE controls the RF module so as to transmit an uplink data to a base station.

In addition, the processor controls the RF module so as to receive first DCI for the uplink data from the base station.

In this case, the first DCI includes a New Data Indicator (NDI) field indicating a transmission or retransmission of the uplink data.

Furthermore, the first DCI is determined by DCI related to HARQ-ACK of the uplink data on whether the first DCI includes a UL grant.

And, when the first DCI is determined to be the DCI related to HARQ-ACK of the uplink data, the NDI field is identified to be related to the HARQ-ACK of the uplink data.

In this case, when the UL grant is not included in the first DCI, the NDI field may be identified to be related to the HARQ-ACK of the uplink data.

In addition, when the UL grant is included in the first DCI, the NDI field may be identified to be related to whether a new data is transmitted.

Furthermore, when the NDI field is identified to be related to the HARQ-ACK of the uplink data, a field value of the NDI field may be dropped.

In addition, when the NDI field is identified to be related to the HARQ-ACK of the uplink data, a field value of the NDI field may be a fixed value.

Furthermore, when the NDI field is identified to be related to whether a new data is transmitted, a field value of the NDI field may be stored in a specific entity.

In addition, when the UL grant is not included in the first DCI, the first DCI may further include a Redundancy Version (RV) field and HARQ ID information In this case, the HARQ-ACK of the uplink data may be determined based on the Redundancy Version (RV) field and the HARQ ID of the first DCI.

In addition, the first DCI may further include a field related to a transmission of a Transport Block (TB).

In this case, when the UL grant is not included in the first DCI, the field related to a transmission of a TB may indicate at least one of information related to a Bandwidth part (BWP) switching and information related to a Physical Downlink Control Channel (PDCCH) monitoring.

Furthermore, when the NDI field is identified to be related to the HARQ-ACK of the uplink data, the processor may control the RF module so as to delete the information related to the uplink data stored in a MAC buffer.

FIG. 10 is a flowchart illustrating a base station operation method for transmitting DCI including HARQ-ACK information proposed in the present disclosure.

That is, FIG. 10 shows a base station operation method for transmitting an explicit HARQ-ACK through Downlink Control Information (DCI) in a wireless communication system.

First, a base station receives an uplink data from a UE (step, S1010).

In addition, the base station transmits first DCI for the uplink data to the UE (step, S1020).

In this case, the first DCI includes a New Data Indicator (NDI) field indicating a transmission or retransmission of the uplink data.

In addition, the first DCI is determined to be DCI related to HARQ-ACK of the uplink data on whether the first DCI includes a UL grant.

Furthermore, when the first DCI is determined to be the DCI related to HARQ-ACK of the uplink data, the NDI field is identified to be related to the HARQ-ACK of the uplink data.

In this case, when the NDI field is identified to be related to the HARQ-ACK of the uplink data, the information related to the uplink data stored in a MAC buffer may be deleted.

Each embodiment or each method described above may be individually performed, or one or more embodiments or methods may be performed through a combination, and the method proposed in the present disclosure may be implemented.

Overview of Device to which the Present Disclosure is Applicable

A device to which the present disclosure is applicable is described below.

FIG. 11 illustrates a wireless communication device to which methods described in the present disclosure are applicable.

Referring to FIG. 11, a wireless communication system may include a first device 1110 and a second device 1120.

The first device 1110 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

The second device 1120 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

For example, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), or the like. For example, the HMD may be a display device worn on the head. For example, the HMD may be used to implement the VR, AR, or MR device.

For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment. For example, the FinTech device may include a payment device, point of sales (POS), or the like. For example, the climate/environment device may include a device for monitoring and predicting the climate/environment.

The first device 1110 may include at least one processor such as a processor 1111, at least one memory such as a memory 1112, and at least one transceiver such as a transceiver 1113. The processor 1111 may perform functions, procedures, and/or methods described above. The processor 1111 may perform one or more protocols. For example, the processor 1111 may perform one or more layers of a radio interface protocol. The memory 1112 is connected to the processor 1111 and may store various types of information and/or instructions. The transceiver 1113 is connected to the processor 1111 and may be configured to transmit and receive radio signals.

The second device 1120 may include at least one processor such as a processor 1121, at least one memory such as a memory 1122, and at least one transceiver such as a transceiver 1123. The processor 1121 may perform functions, procedures, and/or methods described above. The processor 1121 may perform one or more protocols. For example, the processor 1121 may perform one or more layers of a radio interface protocol. The memory 1122 is connected to the processor 1121 and may store various types of information and/or instructions. The transceiver 1123 is connected to the processor 1121 and may be configured to transmit and receive radio signals.

The memory 1112 and/or the memory 1122 may be connected inside or outside the processor 1111 and/or the processor 1121, respectively, and may be connected to another processor through various technologies, such as a wired or wireless connection.

The first device 1110 and/or the second device 1120 may have one or more antennas. For example, an antenna 1114 and/or an antenna 1124 may be configured to transmit and receive radio signals.

FIG. 12 illustrates another example of a block configuration diagram of a wireless communication device to which methods described in the present disclosure are applicable.

Referring to FIG. 12, a wireless communication system includes a base station 1210 and multiple UEs 1220 located in an area of the base station. The base station 1210 may be represented as a transmitter, and the UE 1220 may be represented as a receiver, or vice versa. The base station 1210 and the UE 1220 respectively include processors 1211 and 1221, memories 1212 and 1224, one or more Tx/Rx RF modules 1215 and 1225, Tx processors 1212 and 1222, Rx processors 1213 and 1223, and antennas 1216 and 1226. The processors implement functions, processes, and/or methods described above. More specifically, in DL (communication from the base station to the UE), an upper layer packet from a core network is provided to the processor 1211. The processor implements functionality of the L2 layer. In the DL, the processor provides the UE 1220 with multiplexing between a logical channel and a transport channel and radio resource allocation and is also responsible for signaling to the UE 1220. The transmit (Tx) processor 1212 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1216 via a separate Tx/Rx module (or transceiver 1215). Each Tx/Rx module may modulate an RF carrier with a respective spatial stream for transmission. At the UE, each Tx/Rx module (or transceiver 1225) receives a signal through the respective antenna 1226 of each Tx/Rx module. Each Tx/Rx module recovers information modulated onto an RF carrier and provides the information to the receive (Rx) processor 1223. The Rx processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that are originally transmitted by the base station on the physical channel. The corresponding data and control signals are provided to the processor 1221.

UL (communication from the UE to the base station) is processed at the base station 1210 in a manner similar to the description associated with a receiver function at the UE 1220. Each Tx/Rx module 1225 receives a signal via the respective antenna 1226. Each Tx/Rx module provides an RF carrier and information to the Rx processor 1223. The processor 1221 may be associated with the memory 1224 that stores a program code and data. The memory may be referred to as a computer readable medium.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR system, the present disclosure can be applied to various wireless communication systems other than the 3GPP LTE/LTE-A/NR system.

The invention claimed is:

1. A method for receiving an explicit hybrid automatic repeat request-acknowledgement (HARQ-ACK) through Downlink Control Information (DCI) in a wireless communication system, the method performed by a user equipment comprising:
transmitting, to a base station, an uplink (UL) data;
receiving, from the base station, a first DCI including the explicit HARQ-ACK for the uplink data,
wherein the first DCI further includes a code point related to a DCI format of the first DCI, and a first New Data Indicator (NDI) field indicating a first value related to a new transmission of a new data or a second value related to a retransmission of the uplink data,
wherein the first DCI does not require a transmission of a physical uplink shared channel (PUSCH) for the first DCI to the user equipment;
based on the first NDI field being related to the code point, flushing information related to the uplink data stored in a HARQ process buffer of the user equipment;
receiving, from the base station, a second DCI including a second NDI field; and
based on i) the second NDI field indicating the second value related to the retransmission, ii) the HARQ process buffer being flushed, and iii) the second DCI including a UL grant, performing the new transmission of the new data to the base station based on the UL grant.

2. The method of claim 1, wherein, when the UL grant is not included in the second DCI, the second NDI field is identified to be related to the HARQ-ACK of the uplink data, and
wherein, when the UL grant is included in the second DCI, the second NDI field is identified to be related to whether a new data is transmitted.

3. The method of claim 1, wherein, when the second NDI field is identified to be related to the HARQ-ACK of the uplink data, a field value of the second NDI field is dropped.

4. The method of claim 1, wherein, when the second NDI field is identified to be related to the HARQ-ACK of the uplink data, a field value of the second NDI field has a fixed value.

5. The method of claim 1, wherein, when the second NDI field is identified to be related to whether a new data is transmitted, a field value of the second NDI field is stored in a specific entity.

6. The method of claim 1, wherein, when the UL grant is not included in the second DCI, the second DCI further includes a Redundancy Version (RV) field and HARQ ID information, and
the HARQ-ACK of the uplink data is determined based on the Redundancy Version (RV) field and the HARQ ID of the second DCI.

7. The method of claim 6, wherein the second DCI includes information for a trigger of Aperiodic-Channel State Information (AP-CSI) and a UL-SCH indicator field.

8. The method of claim 7, wherein the second DCI triggers the AP-CSI, and a value of the UL-SCH indicator field is 0.

9. The method of claim 1, wherein, when the UL grant is not included in the second DCI, the second DCI further includes a field related to a transmission of a Transport Block (TB), and
wherein the field related to a transmission of a TB indicates at least one of information related to a Bandwidth part (BWP) switching and information related to a Physical Downlink Control Channel (PDCCH) monitoring.

10. The method of claim 9, wherein the information related to a BWP is a period of the BWP switching, and the information related to a PDCCH monitoring is a skip period of the PDCCH monitoring.

11. The method of claim 9, wherein the information related to a PDCCH monitoring is information for changing a search space of the PDCCH monitoring.

12. The method of claim 9, wherein the information related to a PDCCH monitoring is a search period of the PDCCH monitoring.

13. The method of claim 1, when the second NDI field is identified to be related to the HARQ-ACK of the uplink data, further comprising deleting the information related to uplink data.

14. A user equipment for receiving an explicit hybrid automatic repeat request-acknowledgement (HARQ-ACK) through Downlink Control Information (DCI) in a wireless communication system, the user equipment comprising:
a transceiver for transmitting and receiving a wireless signal; and a processor functionally connected to the transceiver, wherein the processor is configured to:

transmit, to a base station, an uplink (UL) data;

receive, from the base station, a first DCI including the explicit HARQ-ACK for the uplink data, wherein the first DCI further includes a code point related to a DCI format of the first DCI, and a first New Data Indicator (NDI) field indicating a first value related to a new transmission of a new data or a second value related to a retransmission of the uplink data, wherein the first DCI does not require a transmission of a physical uplink shared channel (PUSCH) for the first DCI to the user equipment;

based on the first NDI field is being related to the code point, flush information related to the uplink data stored in a HARQ process buffer of the user equipment;

receive, from the base station, a second DCI including a second NDI field; and based on i) the second NDI field indicating the second value related to the retransmission, ii) the HARQ process buffer being flushed, and iii) the second DCI including a UL grant, perform the new transmission of the new data to the base station based on the UL grant.

15. The user equipment of claim 14, wherein, when the UL grant is not included in the second DCI, the second NDI field is identified to be related to the HARQ-ACK of the uplink data, and wherein, when the UL grant is included in the second DCI, the second NDI field is identified to be related to whether a new data is transmitted.

16. The user equipment of claim 14, wherein, when the second NDI field is identified to be related to the HARQ-ACK of the uplink data, a field value of the second NDI field is dropped.

17. The user equipment of claim 14, wherein, when the second NDI field is identified to be related to the HARQ-ACK of the uplink data, a field value of the second NDI field has a fixed value.

18. The user equipment of claim 14, wherein, when the second NDI field is identified to be related to whether a new data is transmitted, a field value of the second NDI field is stored in a specific entity.

19. The user equipment of claim 14, wherein, when the UL grant is not included in the second DCI, the second DCI further includes a Redundancy Version (RV) field and HARQ ID information, and the HARQ-ACK of the uplink data is determined based on the Redundancy Version (RV) field and the HARQ ID of the second DCI.

20. A method for transmitting an explicit hybrid automatic repeat request-acknowledgement (HARQ-ACK) through Downlink Control Information (DCI) in a wireless communication system, the method performed by a base station comprising:

receiving, from a user equipment, an uplink (UL) data;

transmitting, to the user equipment, a first DCI including the explicit HARQ-ACK for the uplink data, wherein the first DCI further includes a code point related to a DCI format of the first DCI, and a first New Data Indicator (NDI) field indicating a first value related to a new transmission of a new data or a second value related to a retransmission of the uplink data, wherein the first DCI does not require a transmission of a physical uplink shared channel (PUSCH) for the first DCI to the user equipment, wherein based on the first NDI field being related to the code point, information related to the uplink data stored in a HARQ process buffer of the user equipment is flushed;

transmitting, to the user equipment, a second DCI including a second NDI field; and based on i) the second NDI field indicating the second value related to the retransmission, ii) the HARQ process buffer being flushed, and iii) the second DCI including a UL grant, receiving the new transmission of the new data from the user equipment based on the UL grant.

* * * * *